R. A. BEAUSEJOUR.
ARTICLE HOLDER FOR LIQUID COATING MACHINES.
APPLICATION FILED APR. 17, 1908.
1,109,314.
Patented Sept. 1, 1914.
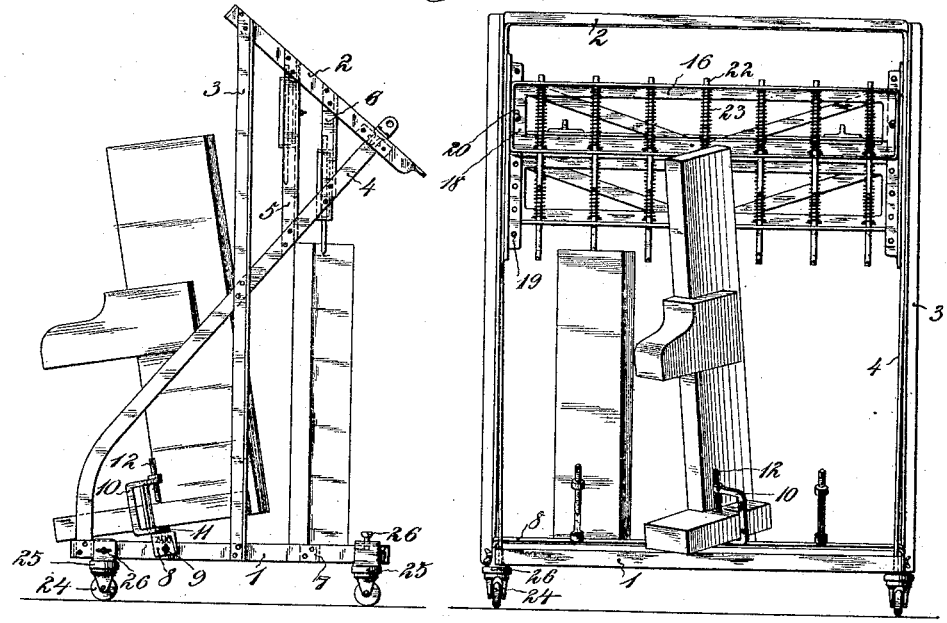
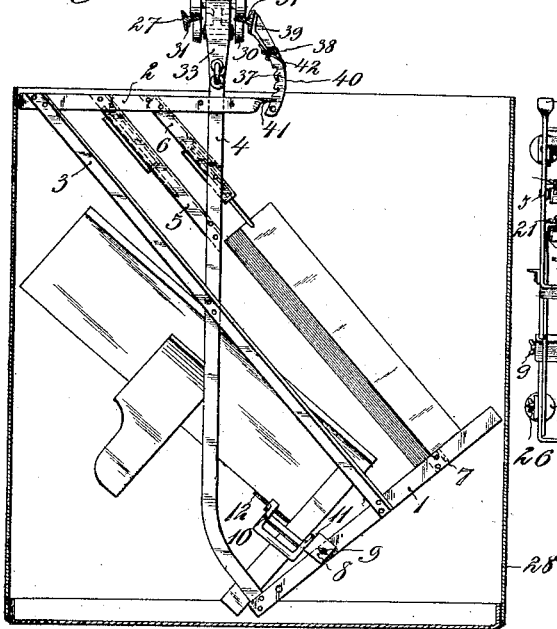
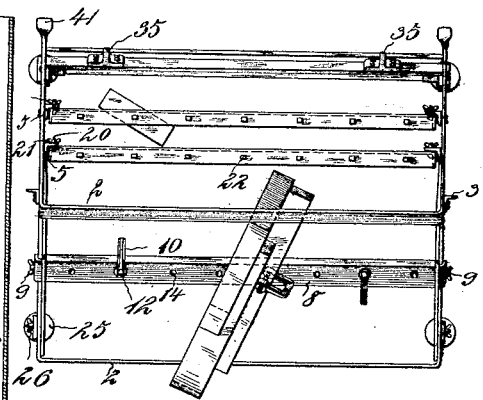

R. A. BEAUSEJOUR.
ARTICLE HOLDER FOR LIQUID COATING MACHINES.
APPLICATION FILED APR. 17, 1908.
1,109,314.
Patented Sept. 1, 1914.
2 SHEETS—SHEET 2.
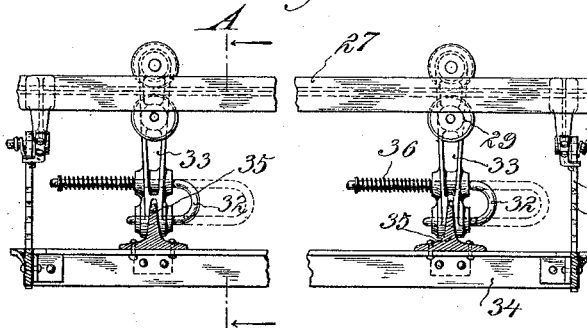
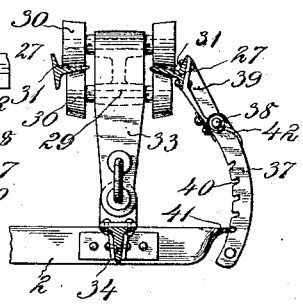
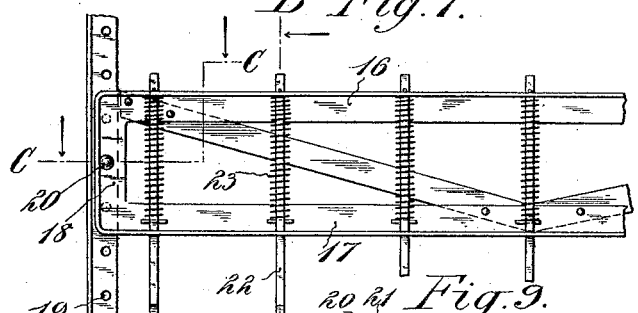
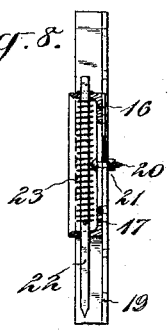
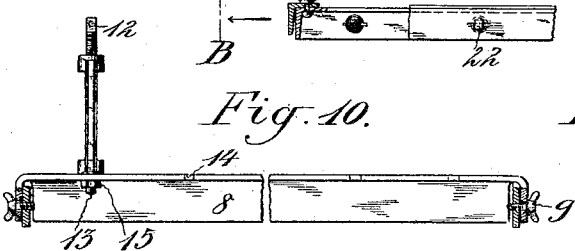
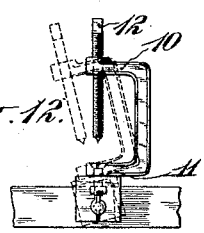
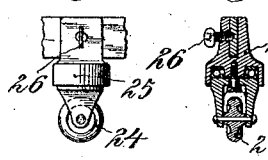
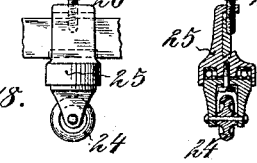
Witnesses:
Inventor

UNITED STATES PATENT OFFICE.

REME A. BEAUSEJOUR, OF NEW YORK, N. Y., ASSIGNOR TO STANDARD VARNISH WORKS, OF NEW YORK, N. Y., A CORPORATION OF NEW YORK.

ARTICLE-HOLDER FOR LIQUID-COATING MACHINES.

1,109,314.     Specification of Letters Patent.     Patented Sept. 1, 1914.

Application filed April 17, 1908. Serial No. 427,658.

*To all whom it may concern:*

Be it known that I, REME A. BEAUSEJOUR, a subject of the Crown of Great Britain, and resident of the borough of Brooklyn, in the city and State of New York, have invented a new and useful Improvement in Article-Holders for Liquid-Coating Machines, of which the following is a specification.

This invention relates to improvements in article holders for use in connection with liquid coating machines and has for its object to provide certain improvements in the construction, form and arrangement of the several parts of a holder whereby the articles may be supported in the desired angular position within the holder to produce the best results when the articles are being treated with a coating liquid; the holder being so constructed that it may be readily attached to and detached from its suspension means and also so that the traction wheels may be removably secured thereto for supporting the holder in stable equilibrium when removed from the tank and disengaged from its suspension means.

A practical embodiment of my invention is represented in the accompanying drawings in which—

Figure 1 represents the holder in side elevation with two piano parts supported thereon, the holder being shown in the position which it assumes when detached from its suspension means and resting upon its traction wheels in stable equilibrium. Fig. 2 is a front view of the same, Fig. 3 is a top plan view, Fig. 4 is a side view of the holder and the parts supported thereby in the position which the holder assumes when attached to its suspension means, the dipping tank within which the holder is located being shown in section, Fig. 5 is an enlarged detail view partially in section, showing the means for detachably securing the holder to its suspension means, Fig. 6 is a section taken in the plane of the line A—A of Fig. 5, looking in the direction of the arrows, Fig. 7 is an enlarged detail view showing the several groups of spring-pressed fingers and their vertically adjustable supporting arm, Fig. 8 is a section taken in the plane of the line B—B of Fig. 7, looking in the direction of the arrows, Fig. 9 is a section taken in the plane of the line C—C of Fig. 7, looking in the direction of the arrows, Fig. 10 is an enlarged detail view showing one of the series of clamps and its removable supporting cross bar, Fig. 11 is a partial top plan view, Fig. 12 is a view taken at right angles to Fig. 10, the clamp being shown in one of its angular adjustments in full lines and in another of its angular adjustments in dotted lines, Figs. 13, 14, 15 are detail side, section and top plan views illustrating a traction wheel for the holder, showing one way of removably securing the same to the holder, and Figs. 16, 17, 18, are detail side, section and top plan views showing another way of removably securing the traction wheel to the holder.

The holder comprises a main frame which includes a bottom 1 and a top 2 arranged at an angle thereto, said bottom and top being connected at both sides by crossed side bars 3 and 4, the side bars 3 leading from the front of the top 2 to a point intermediate the front and back of the bottom 1, and the bars 4 leading from the back of the top 2 to the front of the bottom 1. Additional side bars 5 and 6 extend from the bar 4 to the top 2 parallel with the side bars 3. A bottom cross bar 7 forms a bottom support for one set of articles. A clamp supporting cross bar 8 is removably secured to the bottom 1 of the holder, in the present instance by providing the bar 8 with downwardly turned ends through which clamp screws 9 pass into engagement with the sides of the bottom 1. This cross bar 8 is pivoted on these clamp screws 9 so that it may be tilted to bring the clamps carried thereby into different angular positions, as clearly shown in Fig. 12. The upper and lower jaws 10, 11, of each of these clamps is fitted to embrace a portion of the article to be supported and the upper jaw 10 is provided with a set screw 12 arranged to secure the article to the clamp. The lower jaw 11 of the clamp is pivoted to swing into any lateral angular position, as clearly shown in Fig. 11, in the present instance by providing the lower jaw with a bolt 13 passing through a hole 14 in the cross bar 8 and a nut 15 for said bolt.

A plurality of loop frames are located at the top of the holder, each loop frame comprising upper and lower horizontal portions 16, 17, and connecting side portions 18. In the present instance two of these loop frames are shown. These loop frames are vertically adjustable along the side bars 5 and 6, by providing the side bars with vertical series of holes 19 and the vertical portions 18 of the loop frames with screw bolts 20 and thumb nuts 21. Each of these loop frames is provided with a plurality of spring-pressed longitudinally sliding fingers 22 having pointed inner ends arranged to engage the tops of the articles to be treated and thus assist in holding the articles in position within the holder. Each of these fingers 22 slides through the upper and lower horizontal portions 16, 17, of the loop frame and a spring 23 is provided for yieldingly holding said finger at the limit of its downward movement.

Traction wheels 24 are removably secured to the bottom 1 of the frame in position to support the frame in stable equilibrium with its bottom in a substantially horizontal position. These traction wheels are shown as ball bearing casters and in Figs. 13, 14, 15, I have shown one means of removably securing the casters to the holder, said means comprising a socket member 25 arranged to embrace the side rail of the bottom and a thumb screw 26 for clamping the socket member 25 in position. In the form shown in Figs. 16, 17, 18, the socket member 25 extends above the side rail of the bottom and the thumb screw 26 is vertically arranged instead of horizontally arranged as shown in Figs. 13, 14, 15.

The suspension means to which the holder is removably attached comprises a track 27 extending across the top of the dipping tank 28, along which track is fitted to travel double trucks 29 having wheels 30 arranged to engage and travel along the upper and lower faces of the webs 31 of the track rails. Two of these double trucks 29 are preferably provided for suspending each holder, which trucks are removably attached to the holder as follows. A hook-shaped latch 32 has its shank fitted to slide in the depending arm 33 of the truck 29 and its free end fitted to pass through the bifurcated ends of said arm 33. The top 2 of the holder is provided with a cross bar 34 on which are two uprising lugs 35 arranged to enter the spaces between the ends of the bifurcated arms 33 of the double trucks so that when the hook-shaped latches 32 are in their clamped position, their free ends may pass through the bifurcated ends of the arms 33 and the lugs 35 of the holder. Springs 36 on the shanks of these latches 32 serve to yieldingly hold the latches at the limit of their inward movement.

The means which I employ for holding the holder against swinging when suspended from the track during the operation of dipping, is as follows. A spring-pressed latch 37 is hinged at 38 to a projection 39 on the track 27, which latch is provided with a vertical series of notches 40 arranged to receive in one of them the flattened end 41 of the side bar of the top 2 of the holder, according to the inclination which the holder assumes under the influence of the weight of the articles to be dipped. A spring 42 serves to hold the latch 37 at the limit of its inward movement. There are two of these spring-pressed latches shown in the accompanying drawings for engaging both of the side bars of the top 2 of the holder.

When the holder is suspended from the track, the top 2 of the holder will assume a substantially horizontal position, thus permitting the articles being dipped to assume a considerable angular position to facilitate the rapid flowing of the liquid therefrom as the articles are raised from the tank.

In operation, after the articles have been firmly secured within the holder, the holder is attached to the trucks 29 of its suspension means by the hook-shaped latches 32. The trucks are then moved along the track 27 to bring the holder into a position over the dipping tank. The spring-pressed latches 37 are then engaged with the top of the holder for preventing any swinging movement thereof during the dipping operation. The track 27 is then lowered by any suitable means, not shown herein, the traction wheels being first removed from the holder. The track is then raised for removing the holder from the tank. The trucks are then moved along the track to bring the holder into any desired position on the floor. The traction wheels are then secured to the bottom of the holder and the holder is released from its suspension means. The articles may then be permitted to dry without the necessity of removing them from the holder as another holder with its articles to be dipped may be attached to the holder suspension means and the operation hereinabove described repeated.

In some classes of work it will be found necessary to remove the clamp supporting bar 8 and in such cases this bar with its clamps may be readily removed by unscrewing the clamp screws 9.

It will be seen that the several article engaging parts have an ample adjustment for securing the articles in any desired position within the holder.

It is evident that various changes might be resorted to in the construction, form and arrangement of the several parts without departing from the spirit and scope of my invention; hence I do not wish to limit myself strictly to the structure herein set forth, but

What I claim is:

An article holder for liquid coating machines having a main frame comprising a bottom; a top arranged at an angle thereto, and crossed side bars leading respectively from the front of the top to an intermediate point on the bottom and from the back of the top to the front of the bottom and additional side bars parallel with the first described cross bars and auxiliary holding frames adjustable along the said additional side bars to coöperate with the bottom in holding articles.

In testimony, that I claim the foregoing as my invention, I have signed my name in presence of two witnesses, this 15th day of April, 1908.

REME A. BEAUSEJOUR.

Witnesses:
C. G. SCHURMAN,
WM. HERZ.